B. Illingworth,
Flour Sieve
No. 59,315.                    Patented Oct. 30, 1866.
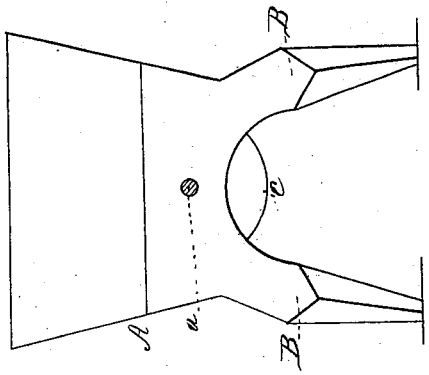
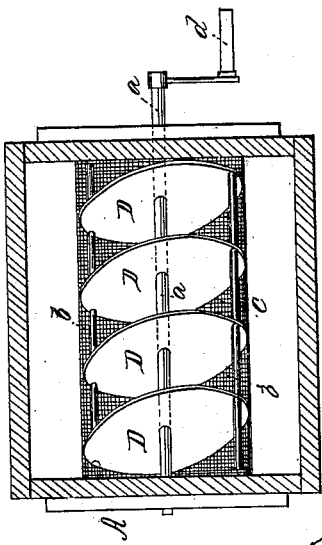
Witnesses:
A. A. Yeatman
Charles Alexander
Inventor
B. Illingworth
per
Alexander & Mason
Attorney

UNITED STATES PATENT OFFICE.

B. ILLINGWORTH, OF FREEPORT, ILLINOIS, ASSIGNOR TO J. B. BYERLY AND C. A. SHEETZ, OF SAME PLACE.

IMPROVED FLOUR-SIFTER.

Specification forming part of Letters Patent No. 59,315, dated October 30, 1866.

*To all whom it may concern:*

Be it known that I, B. ILLINGWORTH, of Freeport, in the county of Stephenson and State of Illinois, have invented certain new and useful Improvements in Flour and Meal Sifters; and do hereby declare that the following is a full, clear, and exact description of the same, reference being had to the accompanying drawings, and to the letters of reference marked thereon, making a part of this specification.

Figure 1 represents a plan view. Fig. 2 represents an end view.

In the annexed drawings, A is a wooden box of any suitable form, and provided with legs B. The bottom of this box is a wire sieve, C, semicircular in shape, and firmly secured to the wood-work.

$a$ represents a horizontal bar, which extends from side to side of the box and near the bottom of the same, having a suitable handle, $d$, at the outer end. Upon this bar, within the box, is secured a series of metallic disks, D, set in an oblique position, as shown, and held in their proper positions by the rods $b\ b$. These disks are made of a size to extend just to the sieve C, and the rods $b$ are placed just opposite to each other, to assist in sifting, as well as prevent the grinding of foreign matter while in use.

The operation of this invention is merely placing the flour or meal within the box A (having a device under the sieve to receive the siftings) and turning the crank $d$. The revolutions of the disks and rods perfectly perform the duties for which the device is intended.

Having thus fully described my invention, what I claim as new, and desire to secure by Letters Patent, is—

The box A, provided with legs, having a horizontal bar, $a$, with the disks D and rods $b\ b$, operating upon the semicircular sieve C, when arranged in the manner substantially as herein specified.

As evidence that I claim the foregoing I have hereunto set my hand in the presence of two witnesses.

B. ILLINGWORTH.

Witnesses:
   Jos. B. SMITH,
   JAS. A. MITCHELL.